United States Patent [19]

Abendroth

[11] Patent Number: 5,890,099
[45] Date of Patent: Mar. 30, 1999

[54] APPARATUS FOR MEASURING A TURNING RATE, PARTICULARLY OF A MOTOR VEHICLE

[75] Inventor: Manfred Abendroth, Marbach, Germany

[73] Assignee: Robert Bosch GmbH, Stuttgart, Germany

[21] Appl. No.: 876,187

[22] Filed: Jun. 18, 1997

[30] Foreign Application Priority Data

Jun. 26, 1996 [DE] Germany ............... 196 25 058.7

[51] Int. Cl.$^6$ .............................................. G06F 15/00
[52] U.S. Cl. .................... 702/94; 702/92; 702/93; 701/307; 701/224
[58] Field of Search .................. 364/571.01–571.08, 364/565, 184; 701/200–224; 702/92, 93, 94, 95

[56] References Cited

U.S. PATENT DOCUMENTS

| | | |
|---|---|---|
| 4,759,220 | 7/1988 | Burdess et al. . |
| 4,953,305 | 9/1990 | Van Lente et al. .................. 364/184 |
| 5,090,231 | 2/1992 | Gallagher .................. 702/99 |
| 5,151,862 | 9/1992 | Nakayama et al. . |
| 5,235,514 | 8/1993 | Matsuzaki .................. 364/454 |
| 5,319,561 | 6/1994 | Matsuzaki .................. 364/454 |
| 5,327,348 | 7/1994 | Kato .................. 364/449 |
| 5,404,307 | 4/1995 | Odagawa .................. 364/454 |
| 5,410,481 | 4/1995 | Kriz . | |
| 5,424,953 | 6/1995 | Masumoto et al. .................. 364/449 |

FOREIGN PATENT DOCUMENTS

| | | |
|---|---|---|
| 0 474 362 A2 | 3/1992 | European Pat. Off. . |
| 0 485 132 A2 | 5/1992 | European Pat. Off. . |

*Primary Examiner*—John Barlow
*Assistant Examiner*—Bryan Bui
*Attorney, Agent, or Firm*—Michael J. Striker

[57] ABSTRACT

The apparatus for determining turning rate, particularly of a motor vehicle, includes two sensor systems (1,3), each of which generate at least one output signal depending on the turning rate. The sensor signals from both sensor systems are combined by a microcontroller including a memory to determine the turning rate accounting for offset drift and sensitivity drift. The first sensor system (1) includes an electronic compass with at least two sensor components (10) each including at least one magnetoresistive element (19) arranged in a Wheatstone bridge for detecting an X-component, a Y-component or a Z-component of the earth's magnetic field. The second sensor system (3) generates a sensor signal according to a Coriolis force experience by an oscillating structure. Each sensor component (10) of the first sensor system also includes an integrated field compensation coil ($L_F$) and a set/reset coil ($L_C$) located next to the Wheatstone bridge, a preamplifier (12) with offset compensation connected across the Wheatstone bridge (11), a flip source connected to the field compensation coil, a demodulator receiving output signals from the preamplifier and a current controller connected to the set/reset coil and demodulator.

8 Claims, 3 Drawing Sheets

APPARATUS FOR MEASURING A TURNING RATE, PARTICULARLY OF A MOTOR VEHICLE

BACKGROUND OF THE INVENTION

The present application relates to an apparatus for measuring a turning rate and, more particularly, to an apparatus for measuring the turning rate of a motor vehicle.

An apparatus of this type is known comprising a sensor system which generates a signal according to a turning rate based on a certain measurement principle and a signal processing means which determines the turning rate from a signal supplied to it.

The use of a turning rate sensor, which operates for example according to the principle of the vibrating gyrometer, is already known in connection with systems for controlling vehicle dynamics of motor vehicles. These sensors are based on detection and analysis of the Coriolis acceleration.

This type of turning rate sensor is known, for example, from U.S. Pat. No. 4,759,220. The sensor comprises a thin-walled hollow cylinder made of elastic material, in which a plurality of piezoelectric sensor elements are arranged. At least two of these sensor elements are arranged over each other in this sensor. These sensor elements are set into a constant mechanically driven oscillation with the help of an oscillator loop or guide. The Coriolis effect together with a turning speed coupled perpendicularly to the driven oscillation causes a Coriolis acceleration, which causes a deflection of the driven oscillator in the Coriolis direction. This deflection is a measure of the coupled turning rate. The resulting output voltage is analyzed with the help of a detector circuit and finally for determination of the turning rate.

Other oscillating structures are used for determining turning rate besides rotationally symmetric structures. These are, for example, oscillating rods or oscillating forks. Also micromechanical systems can be used which utilize the Coriolis force in oscillating systems in many ways. All these oscillating systems have disadvantageous null point stability problems and the sensitivity drift because of temperature variation and over lifetime. Satisfactory characteristic values can be obtained only with high manufacturing expense and testing efforts in which the problems of detection of offset and of sensitivity errors cannot be entirely avoided.

It is also possible to use the so-called Sagnac Effect in fiber optic gyroscopes for measurement of turning rate. At best they are in a position to fulfill the technical requirements for use in a motor vehicle, but at the current time they cannot be manufactured economically.

An additional possibility for measurement of the turning rate comprises use of an external observer, in the simplest case the earth's magnetic field, whose direction is measured with magnetic field sensitive sensors and/or with an electronic compass. The time dependent change of angle between the earth's magnetic field and the turning vehicle is measured in a suitable electronic circuit as the momentary turning rate. Disadvantageous problems can arise with this method however because of short duration disturbances of the earth's magnetic field, which for example are produced by steel bridges, by passing vehicle or rails. This type of disturbance can certainly make reliable evaluation of a rotation angle and/or a turning rate difficult.

SUMMARY OF THE INVENTION

Since accurate measurement of the turning rate of a vehicle is a difficult problem and since a sensor which can perform this type of measurement must operate in a wide temperature range from about −40° C. to +85° C. and at the same time satisfy high standards regarding null point sensitivity and sensitivity drift, it is an object of the present invention to provide an apparatus for measuring turning rate, especially of a motor vehicle which fulfills these required standards.

According to the invention, the apparatus for measuring turning rate, especially of a motor vehicle, comprises a first sensor means for generating at least one first sensor signal depending on a turning rate of a body based on a first measurement principle, a second sensor means for generating a second sensor signal depending on the turning rate of the body based on a second measurement principle and means for processing the at least one first and second sensor signals from the first and second sensor means to obtain the turning rate.

The apparatus according to the invention measures turning rates from about 0° to 50°/sec with a required resolution of 0.2°/sec.

The apparatus according to the invention for measurement of turning rate of a body, especially a motor vehicle, has the advantage that a particularly reliable and exact measurement can be performed. It is particularly advantageous that the apparatus according to the invention can be economically manufactured. Reasonableness checking can be performed advantageously without substantial effort. A quasi-redundant system is provided, since if one sensor means fails the second is always available. Long duration drifts of offset and sensitivity over the apparatus lifetime are reliably prevented since it can be automatically recalibrated.

These advantages are obtained since two independent measuring systems are combined in a single apparatus for measurement of the rotation rate so that the disadvantages of the individual systems disappear and advantages for using the combined system appear. Two sensor systems are used which operate according to different measurement principles. The output signals of both sensor systems are coupled with each other in a suitable signal processing means or analysis means which can, for example, comprise a microcomputer.

In a preferred embodiment of the invention the first sensor means comprises an electronic compass having means for generating at least two first sensor signals depending on components of the earth's magnetic field and the second sensor means includes an oscillating structure and means for generating the second sensor signal according to a Coriolis force experienced by the oscillating structure.

In a particularly preferred embodiment the microcontroller includes means for setting first and second signals in relation to each other and means for performing a plausibility check for detection of interference.

In another advantageous embodiment of the invention the compass includes at least two magnetoresistive sensor elements arrange in a Wheatstone bridge for detecting an X-and Y-component of the earth's magnetic field. Advantageously this compass includes three magnetoresistive sensor elements so that the Z-component of the earth's magnetic field can be measured as well as the X- and Y-component.

In various advantageous embodiments of the apparatus for measuring turning rate of a body the second sensor means includes an oscillating structure and means for generating a second sensor signal according to a Coriolis force experienced by it. The oscillating structure can be a micromechanical system, a tuning fork, an oscillating rod or a rotationally symmetric structure.

Advantageously the first sensor means includes means for obtaining initial offset and sensitivity values prior to a first operation thereof and the microcontroller includes a memory device for the initial offset and sensitivity values as well as means for considering the initial offset and sensitivity values during a subsequent determination of the turning rate of the body. The second sensor means can include means for calibration of the second sensor means operating according plausibility signals from the first sensor means.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

The apparatus according to the invention combines and couples two different measurement principles and/or measurement methods with each other for determination of the turning rate of a body, especially a motor vehicle, so that the disadvantages of both measurement methods are compensated. At the same time a system arises which monitors itself and is in a position to eliminate offset drift and sensitivity drift over temperature and lifetime.

Figure 1:
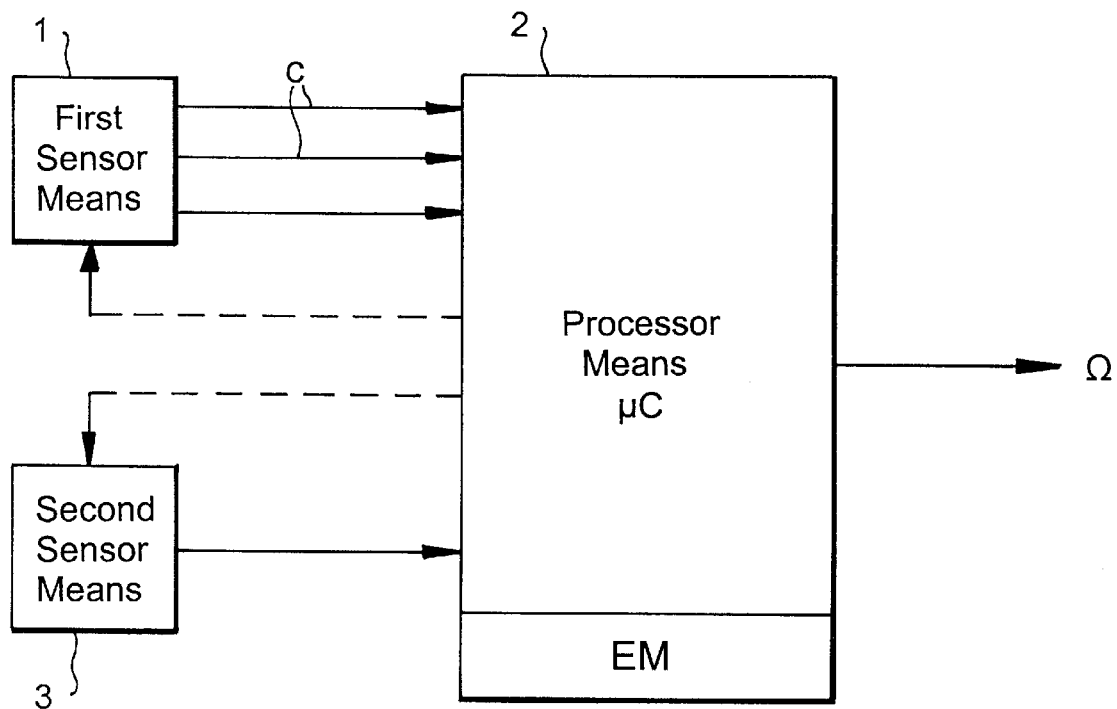
FIG. 1 is a block diagram of the entire apparatus for measuring turning rate according to the invention.

A simplified illustration of the entire apparatus is shown in FIG. 1 with an electronic compass 1 (first sensor means), a turning rate measurement element 3 (second sensor means) and a microcontroller 2, which produces an output signal depending on the turning rate $\Omega$. The combination of the individual devices and/or parts occurs by a suitable number of connecting cables CC. The arrow direction indicates the direction of signal flow.

The microcontroller 2 usually includes an EPROM memory EM, for storing characteristic curve parameters. The measured values can be further transmitted to a subordinate control device via a suitable interface. This interface, for example, can be a CAN-bus system by which information entities are conducted to the motor vehicle control system.

The first sensor means in the apparatus for measurement of turning rate in a motor vehicle includes a compass with up to 3 magnetoresistive sensor elements 19 according to the required sensor quality. The high sensitivity of the magnetoresistive sensor elements 19 allows magnetic fields of the order of the earth's magnetic field to be accurately measured. For building up of an electronic compass the simultaneous measurement of the earth's magnetic field is required in two perpendicular directions parallel to the earth's surface. This is accomplished in a simple manner with two magnetic field sensor elements. Each magnetic field sensor element is extremely sensitive and is based on the magnetic resistive effect of a thin Permalloy film. The sensor component 10 (FIG. 5) contains an integrated field compensation coil $L_F$ and set/reset coil $L_C$ besides the magnetoresistive Wheatstone bridge 11. The integrated field compensation coil $L_F$ permits magnetic field measurement by means of feedback current coupling and produces a first sensor signal which has no sensitivity drift.

Figure 5:
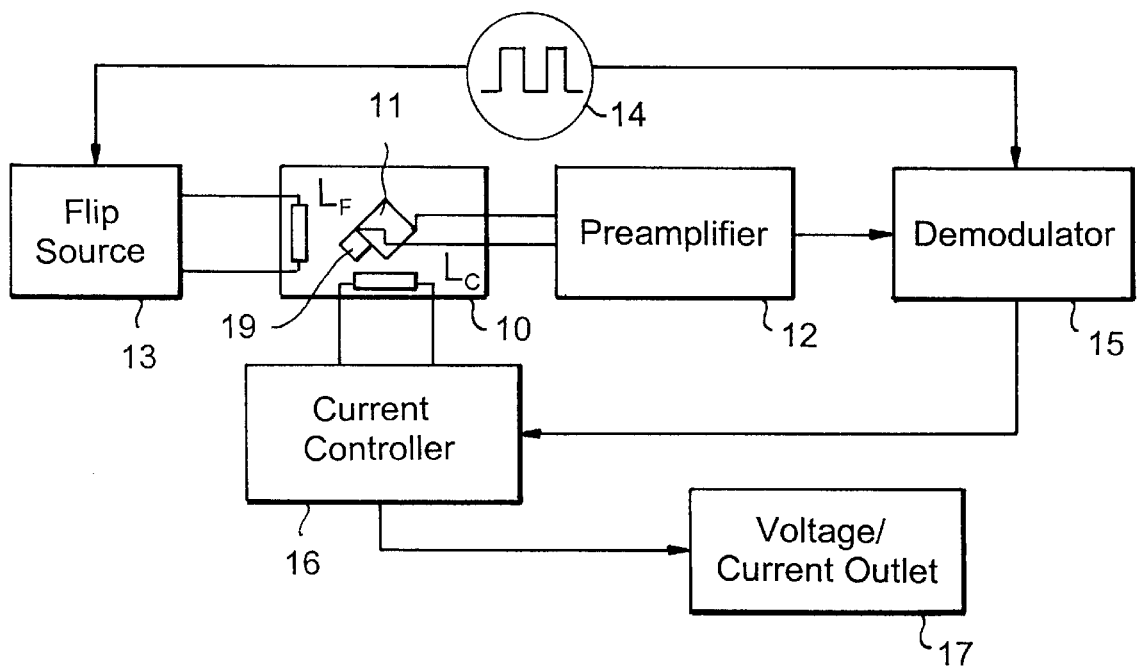
FIG. 5 is block diagram of one part of the high resolution analog compass for one vector component in an embodiment of the apparatus according to the invention.

FIG. 5 shows a block diagram part of a high resolution analog compass for one vector component, in which a preamplifier 12 with offset compensation is connected with the sensor component 10. The feedback current coupling is controlled by current controller 16. The switching of the magnetic field sensitivity occurs with a "flip source" 13, which generates the clock pulses 14. The clock pulses 14 are similarly fed to the phase-sensitive demodulator 15 and provide offset compensation for the output signals of the preamplifier. The demodulator 15 influences the current controller 16, which supplies the measured signal at the voltage and current outlet 17.

The direction of the magnetic field sensitivity can be switched, i.e. "flipped", by the integrated set/reset coil $L_C$. Furthermore a shorter current pulse is required in order to attain an exact alignment of the magnetic particles of the Permalloy film with themselves. A negative current pulse resets the sensor and reverses the sign of its sensitivity.

If periodically alternating flip pulses are used in combination with a Lock-In Amplifier, the output of the sensor is independent of sensor and amplifier offset.

Figure 2A:
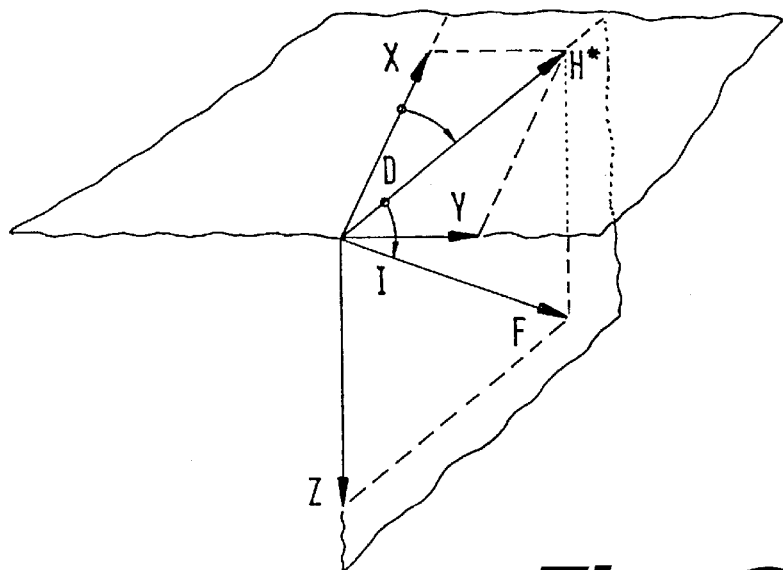
FIGS. 2a and 2b are calibration diagrams illustrating methods of calibrating an electronic compass, which, for example, can be used as the first sensor means.
Figure 2B:
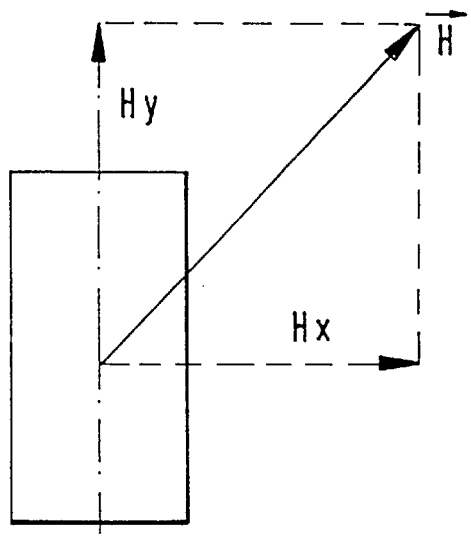

The magnetic compass supplies two first sensor output signals Ux and Uy which contain information regarding the angle $\phi$ relative to the earth's magnetic field. This connection is illustrated in FIGS. 2a and 2b. The earth's magnetic field is described by the field vector F. The measurement of the earth's magnetic field vector with its total intensity F=|F| occurs according to definition with a magnetic instrument which is aligned with a vertical line Z (gravity) and the geographical North direction.

The local declination D (angle between geographical North pole and magnetic North pole), azimuth (positive to the east) and inclination I (angle between F and the local meridian) must be known for navigation purposes. The following relationships exist:

Horizontal intensity; H*=F*cos(I)* cos (D)
with the orthogonal components:
North component X=F*cos(I)* cos (D)
East component: Y=F*cos(I)* sin (D)
Vertical component Z=F*sin(I)

The above-described relationships are illustrated in FIGS. 2a and 2b.

For determination of the turning rate of an object it is sufficient in principle to evaluate or analyze the horizontal intensity H relative to its x- and y-components. The relative position of H relative to the geographical North pole plays no roll:

Hx=H* cos $\phi$

Hy=H* sin $\phi$ wherein $\phi$ represents the angle between the long axis of the object to be observed (e.g. vehicle) and the magnetic North pole (field vector H). Knowledge of declination and inclination does not necessarily need to be given in advance.

Figure 3A:
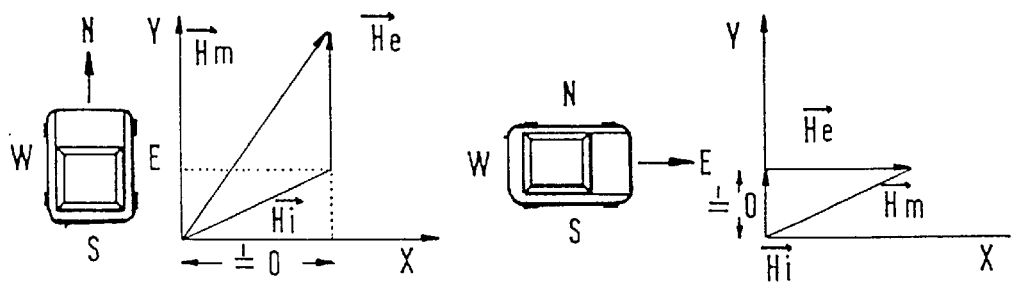
FIGS. 3a and 3b are calibration diagrams illustrating additional methods of calibrating an electronic compass.
Figure 3B:
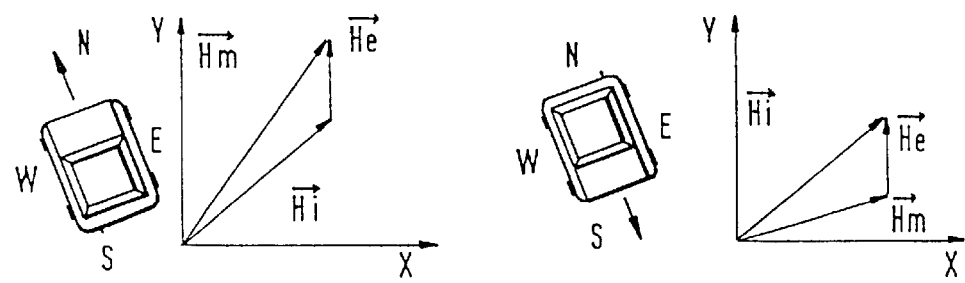

In order to determine the angle $\phi$ in an unobjectionable manner, the self-field of the apparatus location must be compensated, either with the help of a reference compass or by turning the vehicle through a known angle. The method of compensating the self-field using a reference compass is illustrated in FIG. 3a. In FIG. 3b the method for a bidirectional compass, which is calibrated without the aid of other devices is illustrated.

When calibrating with the help of a reference compass in the first step the North-South direction (N/S) is measured and in a second step the east-west direction (E/W) is measured. The interference vector Hi is formed from the magnetic field vector Hm and the earth field He. This is summarized in an X-Y diagram.

The magnetic vector Hm in an arbitrary vehicle position is measured in a first step during the calibration of the bidirectional compass without auxiliary other devices. In the second step the vehicle is turned through 180° and the magnetic field vector Hm is again measured. In the third step then the interference vector Hi is calculated and the earth field He is considered.

In each case the calibration of the electronic compass occurs with the help of a microprocessor, which stores the compensation values in memory. The microprocessor and the memory can be parts of the sensor system itself or parts of an external evaluating or analyzing device.

Figure 4:
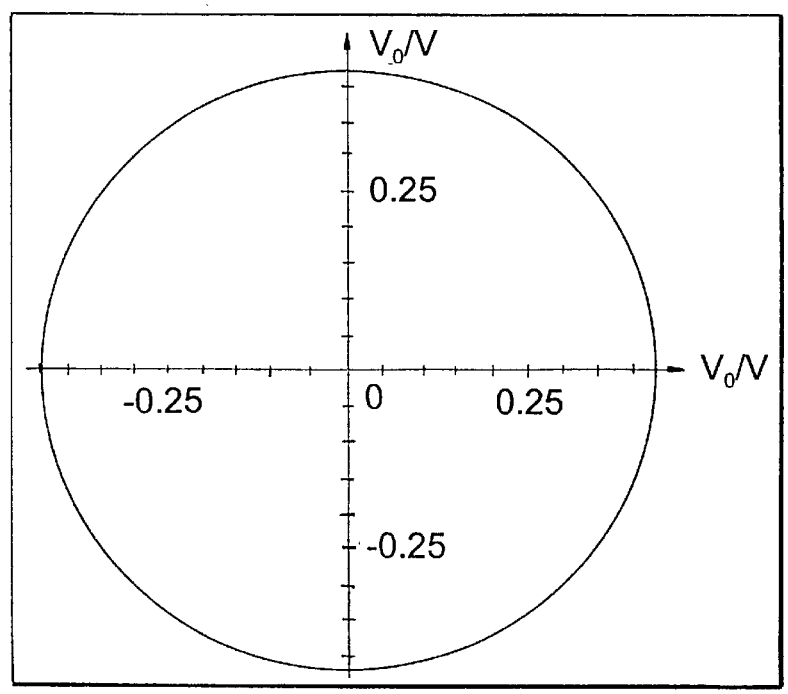
FIG. 4 is a graphical representation of output signals from a high resolution analog compass in the apparatus according to the invention.

The measurement result from the compass is illustrated in FIGS. 3a and 3b. The voltages Ux($\phi$) and Uy($\phi$) obtained after a measurement are shown in an X-Y diagram, which is a circle shown in FIG. 4. In FIG. 4 the results for a high resolution analog compass are shown. The voltage components obtained can be used for determining the turning rate in many ways. At the same time a number of algorithms can be provided, e.g. in the microprocessor, with which the measured turning rate signal is tested for plausibility.

The addition of a third magnetic field sensor element perpendicular to the X-Y plane permits measurement of the Z-component of the earth's magnetic field (Uz). Because of that, an additional plausibility test of the magnetic field values can be performed. The earth's magnetic field in Central Europe is inclined at about 70° relative to the earth's surface. This knowledge can be added to the plausibility testing method. The output voltage Uz is effected also by the instantaneous inclination of the vehicle, which can only fluctuate in certain predetermined ranges, in so far as regular vehicle conditions are present. These regular vehicle conditions are disturbed by pitch fluctuations, during climbing up or climbing down a hill. The resulting variations must be considered during plausibility testing.

Since a comparatively large susceptibility to interference is expected when the electronic compass is used alone, which results from foreign fields or interference of the earth's magnetic field, e.g. by bridges, rails, passing vehicles or the like, incorrect turning rate values can result without protective features. The expected disturbances can be produced in the X- and Y-directions, which can be interpreted in incorrect ways as the turning rate. By the use of a third sensor, which detects the Z-direction component of the earth's magnetic field, the interferences can be clearly detected as such with the help of certain algorithms. In such cases however it is not possible to obtain the turning rate from the signals of the electronic compass.

Because of the above reasons, a second sensor means or system is used, which responds to the turning rate based on another different physical operating principle. This second sensor system can, for example, be a second sensor means which responds to the Coriolis force. This sensor system can be, for example, a tuning fork, an oscillating cylinder, a micromechanical oscillator, an oscillating rod or a magnetohydrodynamic gyroscope. Such sensor means are already known in principle and are used also for measurement of turning rate. The combination of two sensor means, which determine the turning rate based on two different measuring principles, produces the special features and advantages of the claimed invention.

Since the first sensor means in an undisturbed condition usually supplies very accurate information regarding the turning rate, the standard comparatively high requirements for the second sensor means regarding the null point stability, stability or the sensitivity and linearity are not necessary. Thus a simple and economical, so-called low-cost-element can be used as it is currently being used in video cameras for picture stabilization. Complicated manufacturing and adjustment strategies, which are required with current "stand-alone" sensor devices, can be eliminated with this type of device, since it can cooperate with the electronic compass of the first sensor means described hereinabove. This electronic compass can be used to newly continuously calibrate the second sensor means, also the low-cost-turning-rate sensor and thus to obtain characteristic values which are inherent in the more costly device.

The first calibration of the second sensor system occurs after assembly of the motor vehicle in cooperation with the first sensor means, in the embodiments described here, i.e. the electronic compass. The measured parameters in regard to offset and sensitivity are stored in a memory. During vehicle operation the second sensor system and/or the entire sensor system can be observed by the compass in those stages, in which the compass signal is plausible, and the calibration is performed anew, in case, for example, the characteristic values of the sensor have changed by a lifetime effect.

The combination of two different operating principles provides the possibility of testing the turning rate signal better than possible with plausibility testing methods, since a quasi-redundant system is available.

Also it is possible to eliminate the current problems of lifetime drift as well as the drift of offset and sensitivity due to product lifetime, since an automatic recalibration occurs. The combination of both sensor signals occurs in the microprocessor with a suitable multi-channel analog/digital converter and an efficient arithmetic unit, which is able to process the calibration algorithms which requires a substantial effort.

The disclosure in German Patent Application 196 25 058.7 of Jun. 22, 1996 is incorporated here by reference. This German Patent Application, at least in part, describes the invention described hereinabove and claimed in the claims appended herein in below and provides the basis for a claim of priority for the instant invention under 35 U.S.C. 119.

While the invention has been illustrated and described as embodied in an apparatus for measuring the turning rate of a body, especially a motor vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. An apparatus for measuring turning rate, said apparatus comprising
a first sensor means (1) for generating at least one first sensor signal depending on the turning rate of a body based on a first measurement principle;

a second sensor means (3) for generating a second sensor signal depending on the turning rate of the body based on a second measurement principle different from the first measurement principle; and means (2) for processing said at least one first sensor signal and said second sensor signal from the first and second sensor means to determine the turning rate, wherein said first sensor means (1) comprises an electronic compass including means for generating said at least one first sensor signal according to the earth's magnetic field and said second sensor means (3) includes an oscillating structure and means for generating said second sensor signal according to a Coriolis force experienced by said oscillating structure; and wherein the electronic compass includes at least two sensor components (10), each of said at least two sensor components (10) comprising at least one magnetoresistive sensor elements (19) arranged in a Wheatstone bridge (11) for detecting an X-, Y- or Z-component of the earth's magnetic field, an integrated field compensation coil ($L_F$) adjacent the Wheatstone bridge, a set/reset coil ($L_C$) adjacent the Wheatstone bridge, a preamplifier (12) with offset compensation connected across the Wheatstone bridge (11), a flip source connected to the field compensation coil and including means for generating clock pulses, a demodulator connected to the flip source and the preamplifier to receive output signals from the preamplifier and a current controller connected to the set/reset coil and the demodulator, said current controller including means for producing one of the at least one first sensor signals.

2. The apparatus as defined in claim 1, wherein said means (2) for processing includes a microcontroller that combines said at least one first sensor signal and said second sensor signal to obtain said turning rate.

3. The apparatus as defined in claim 2, wherein said microcontroller includes means for adjusting said at least one first sensor signal and said second sensor signal in relation to each other and means for performing a plausibility check for detection of interference.

4. The apparatus as defined in claim 1, wherein said at least two sensor components (10) consist of three of said sensor components (10) so that the Z-component of the earth's magnetic field is measured as well as the X-component and the Y-component.

5. The apparatus as defined in claim 1, wherein said oscillating structure is a micromechanical system, a tuning fork, an oscillating rod or a rotational symmetric structure.

6. The apparatus as defined in claim 1, wherein said means (2) for processing comprises a microcontroller including a memory device for initial offset and sensitivity values and said means for processing combines said at least one first sensor signal and said second sensor signal considering said initial offset and sensitivity values during a subsequent determination of said turning rate.

7. The apparatus as defined in claim 6, wherein said second sensor means (3) includes means for calibrating the second sensor means and said means for calibrating operates according to plausibility signals from said first sensor means.

8. The apparatus as defined in claim 7, wherein said first and second sensor means (3) include means for determining a turning rate of a motor vehicle.

* * * * *